March 14, 1939.  L. D. MANNES ET AL  2,150,691
COLOR REPRODUCTION
Filed March 20, 1937

Leopold D. Mannes
Leopold Godowsky, Jr.
INVENTORS

BY
ATTORNEYS

Patented Mar. 14, 1939

2,150,691

UNITED STATES PATENT OFFICE 2,150,691

COLOR REPRODUCTION

Leopold D. Mannes and Leopold Godowsky, Jr., Rochester, N. Y., assignors to Eastman Kodak Company, Rochester, N. Y., a corporation of New Jersey Application March 20, 1937, Serial No. 132,105

4 Claims. (Cl. 95—2)

This invention relates to color reproduction and particularly to a method for making color transparencies which correctly render the colors of the original subject.

In reproducing colored images or objects by the subtractive method of color photography it is desirable to use subtractive dyes each of which absorbs approximately one-third of the visible spectrum. The colors of the dyes ordinarily used are yellow, magenta and blue-green. The yellow dye should absorb the blue region of the spectrum, the magenta should absorb the green region of the spectrum and the blue-green should absorb the red region of the spectrum.

It is well known that the absorption curves of dyes available for three-color reproduction do not meet the requirements of the theoretically desirable dyes. This factor imposes a limit upon the accuracy of color reproduction possible with any color process and requires that certain corrections be made in order to modify the color densities normally obtained from the separation records. Certain corrections are, therefore, necessary in practically all three-color subtractive processes, due to the fact that the respective subtractive primary dyes or pigments exhibit characteristic deficiencies.

One of the most characteristic of these deficiencies is to be found in the blue transmission of the minus green, or magenta dye. If a multi-layer film of the type in which the layers are sensitive, respectively, to blue, green, and red light is exposed through a pure blue filter and reversed and colored, a positive print would theoretically result containing the maximum magenta and blue-green components but no yellow. Light transmitted by the magenta and blue-green components should then theoretically reproduce the blue of the filter. However, due to the low blue transmission of the magenta dye the blue color resulting in the reproduction will be too dark and usually violet in color. Another characteristic deficiency is that of the minus red or blue-green dye. In a similar way the blue-green positive dye is usually deficient in green or blue and, therefore, does not correctly reproduce these colors.

It is, therefore, an object of the present invention to provide a method for correcting the defects in transmission of the positive color dyes used in subtractive color transparencies.

This object is accomplished in a multi-layer type of film by sensitizing each layer, in addition to its usual sensitivity, to a color which is deficient in the positive dye used to color that layer. Specifically, the green-sensitive layer which is colored with blue-deficient magenta dye is sensitized to blue light and the red-sensitive layer which is colored with blue or green-deficient blue-green dye is sensitized to blue or green light, these auxiliary sensitivities being, in practice, considerably less than the predominant color sensitivity.

In the accompanying drawing which forms a part of the present invention,

Figure 1:
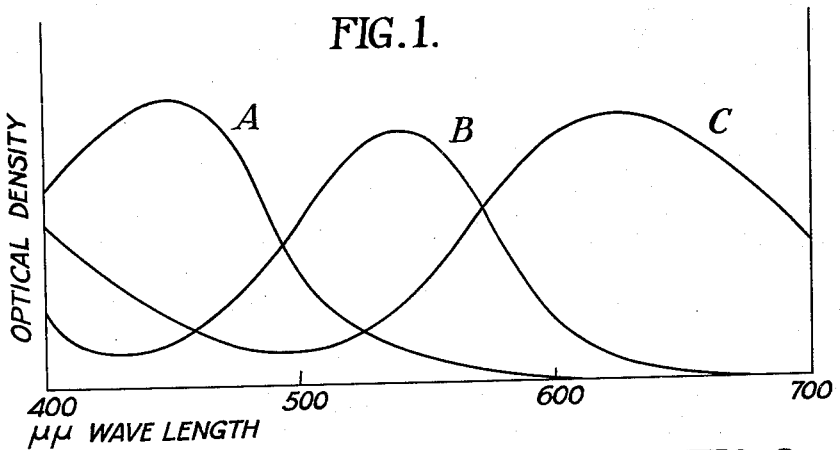
Fig. 1 is a graph showing absorption curves of typical yellow, magenta and blue-green positive dyes.

As is well known three-color photography by the subtractive method, in which a plurality of superposed subtractive images form the final colored image or picture, depends on the use of three dyes or coloring materials, each of which absorbs approximately one-third of the visible spectrum. The dyes used are ordinarily spoken of as being yellow, magenta and blue-green in color. The absorption curves of typical dyes used in subtractive color photography are shown in Fig. 1 of the accompanying drawing in which the wave length of light absorbed is plotted against the optical density or various regions of the visible spectrum. In this drawing A represents the yellow dye which theoretically should absorb light in the blue region of the spectrum and should transmit light in the green and red regions. As may be seen from this curve the yellow dye absorbs quite well in the blue region between 400 mu mu and 500 mu mu, and absorbs very little above 500 mu mu. The magenta dye, represented by curve B, absorbs green light in the region between 500 mu mu and 600 mu mu, but also absorbs some blue light between 400 mu mu and 500 mu mu, in which region it should theoretically transmit light. In a similar manner the blue-green dye C, which should absorb no light in the green and blue regions, has a substantial absorption in the green region between 500 mu mu and 600 mu mu and, although it drops to a minimum at about 500 mu mu, it again rises to a considerable absorption in the lower part of the blue or violet region.

The dyes represented by the curves of Fig. 1 are typical of the dyes available for three-color subtractive photography. Although some dyes are better than others for this purpose, a deficiency in the blue transmission of the magenta dye and of the blue and green transmission of the blue-green dye is a general characteristic of dyes which are at present available.

We have found that if the sensitive layer which is finally colored magenta and which is sensitized to green light, is given an additional sensitivity in the blue region in inverse proportion to the undesirable transmission of the magenta dye in the blue region, a correction of the colors is obtained in the final print. In a similar manner, if the sensitive layer in which the blue-green image is formed, which is sensitized to red light, is given an additional sensitivity in the blue or green region in inverse proportion to the undesirable transmission of blue or green of the blue-green dye, a correction of that color is obtained in the final print. In general, where a positive dye is used which is deficient in light transmission in certain regions of the visible spectrum, the sensitive layer, which is finally colored with that dye, is sensitized in inverse proportion to the undesirable transmission of the dye in that region.

Figure 2:
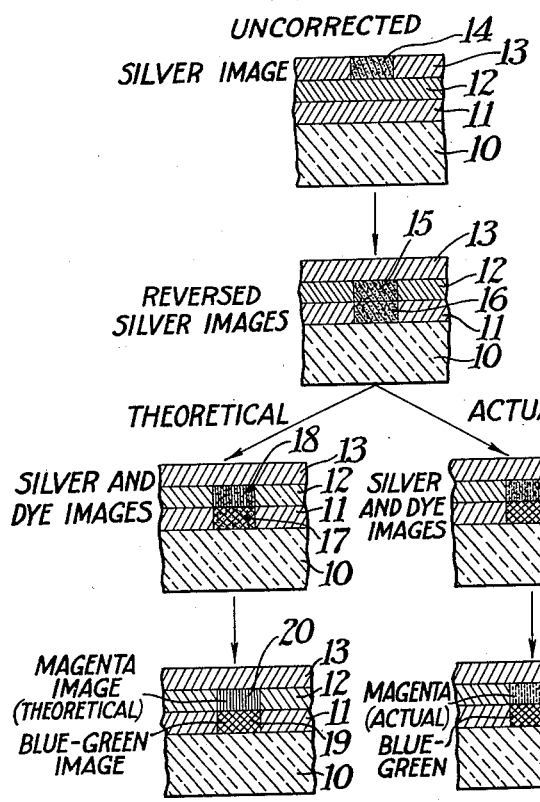
Fig. 2 is a series of sectional views representing stages in the formation of a colored image in an uncorrected manner.
Figure 3:
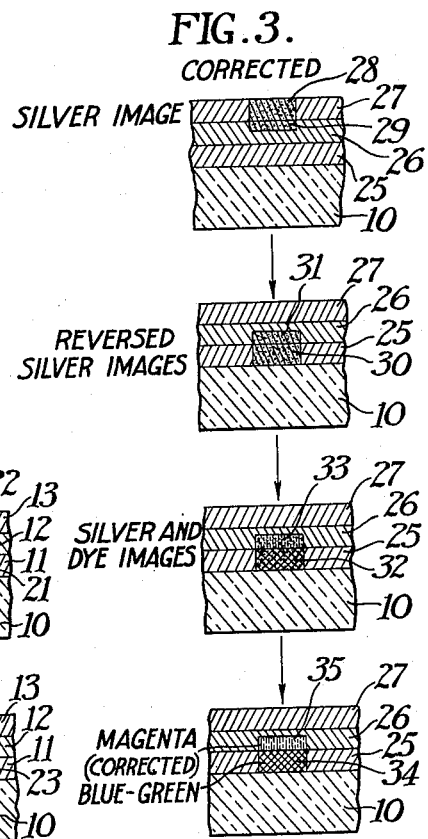
Fig. 3 is a series of sectional views representing formation of a colored image in a corrected manner.

We will now refer to Figs. 2 and 3 of the accompanying drawing in order to explain the effect of this additional sensitization.

As shown in Fig. 2 of the drawing which represents both the theoretical and actual colors obtained, a sensitive element comprising a transparent support 10 coated successively with a red-sensitive layer 11, a green-sensitive layer 12 and a blue-sensitive layer 13 is exposed, for example, to blue light and developed in the usual way to form a silver image 14 in the sensitive layer 13. It is understood that in every case some means is taken to prevent the action of blue light on the sensitive layers 11 and 12. This may consist of a yellow filter dye in the layer 13 or over or under the layer 13.

This film is reversed and by this means reversed silver images 15 and 16 are formed in the layers 12 and 11. According to the theoretical procedure these images are transformed to dye images, a blue-green image 17 being formed in the layer 11 and a magenta image 18 being formed in the layer 12. These images also contain the metallic silver of the reversed silver images. After removal of the metallic silver, dye images 19 and 20, colored blue-green and magenta, respectively, are left in the layers 11 and 12. A process of this type is described in our application, Serial No. 8516, filed February 27, 1935.

In practice it has been found that the dye images formed in these layers are deficient in transmission in certain regions of the spectrum. The silver and dye images actually formed are shown at 21 and 22 in which the blue-green image 21 is considered as being theoretically correct and the magenta image 22 as being deficient in blue transmission, and therefore, somewhat darker and redder in color. After removal of the metallic silver, the blue-green image 23 and the magenta image 24 remain in the two lower layers. Since the magenta image 24 is deficient in blue transmission, the final element does not reproduce blue light by transmission of white light but reproduces a blue which is too dark and usually violet in color.

According to the present invention, as shown in Fig. 3, sensitive layer 26 is made somewhat sensitive to blue in order to overcome this deficiency in the magenta dye, and a silver image is formed initially in both sensitive layers 26 and 27 coated on the support 10 together with the red-sensitive layer 25. The silver image recorded in layer 27 is designated as 28 and the silver image formed in layer 26 is designated as 29. The image 29 is represented as being formed to a slight depth in layer 26, since this layer is sensitive to blue light in inverse proportion to the blue transmission of the magenta dye used to color the image of that layer.

On reversal of this image a silver image 30 is formed in layer 25 and a silver image 31 in layer 26. This silver image is transformed to a silver and dye image either by a subsequent operation or simultaneously with the formation of the silver image in order to form a blue-green and silver image 32 in layer 25 and a magenta and silver image 33 in layer 26. After removal of the metallic silver by a suitable agent, there remain blue-green dye image 34 in layer 25 and magenta dye image 35 in layer 26. The magenta dye image 35 is lower in density than the magenta dye image 24 of the uncorrected process and, therefore, has a higher blue light transmission. For this reason the final image formed by the blue-green image 34 and the magenta image 35 appears blue rather than violet by a transmitted while light. The blue-green component image may be corrected in a similar manner.

We have described our process with particular reference to a multi-layer film in which differentially sensitized layers are coated one over the other on a transparent support. A film of this type in which the layers are sensitized with silver halide and in which colored images are formed by color development is described in our applications, Serial No. 8516, filed February 27, 1935. We are not limited to the use of a film of this type, however. The colored image may be formed by any suitable method, such as color development, mordanting, dye bleaching or in any other suitable manner.

Where silver halide sensitive layers are used and positive dyes are used which have spectral transmissions similar to those shown in Fig. 1 of the drawing, a substantially correct reproduction of color may be obtained by sensitizing a green-sensitive layer with a dye, such as 4-phenyl-3-methyl-1'-ethyl-selanazolo-pseudo-cyanine iodide as disclosed in Brooker U. S. Patent No. 1,969,446, August 7, 1934, and the red-sensitive layer may be sensitized with an 8-alkyl, aryl or aralkyl-3:4:3':4'-dibenzothiocarbocyanine salt as described in Brooker U. S. Patent No. 1,846,301, February 23, 1932.

It is to be understood that the examples and specific compounds referred to in the above specification are by way of example only and that our invention is to be taken as limited only by the scope of the appended claims.

What we claim is:

1. In a method for producing color-corrected pictures, including the steps of exposing to light an element having a plurality of superposed layers each sensitive to a different primary color, and converting said element into a corresponding subtractively colored positive picture, in which at least one of the subtractive colors has a region of inadequate transmission, the step of extending the sensitivity of the corresponding sensitive layer into said region in inverse proportion to its transmission.

2. In a method for producing color-corrected pictures, including the steps of exposing to light an element having a plurality of superposed layers each sensitive to a different primary color, and converting said element into a corresponding subtractively colored positive picture, in which the magenta dye used to color an image has a region of insufficient blue transmission, the step of extending the sensitivity of the green sensitive layer into said region in inverse proportion to the blue transmission of the magenta dye.

3. In a method for producing color-corrected pictures, including the steps of exposing to light an element having a plurality of superposed layers each sensitive to a different primary color, and converting said element into a corresponding subtractively colored positive picture, in which the blue-green dye used to color an image has a region of insufficient green transmission, the step of extending the sensitivity of the red-sensitive layer into said region in inverse proportion to the green transmission of the blue-green dye.

4. In a method for producing color-corrected pictures, including the steps of exposing to light an element having a plurality of superposed layers each sensitive to a different primary color, and converting said element into a corresponding subtractively colored positive picture, in which the blue-green dye used to color an image has a region of insufficient blue transmission, the step of extending the sensitivity of the red-sensitive layer into said region in inverse proportion to the blue transmission of the blue-green dye.

LEOPOLD D. MANNES.
LEOPOLD GODOWSKY, Jr.